G. C. BEMIS.
BLOCK SCRAPER.
APPLICATION FILED SEPT. 21, 1909.

954,497. Patented Apr. 12, 1910.

Witnesses:
Wm. J. Pike.
Edward Maxwell

Inventor:
Gilbert C. Bemis
by Geo. H. Maxwell, Atty.

UNITED STATES PATENT OFFICE.

GILBERT C. BEMIS, OF LYNN, MASSACHUSETTS, ASSIGNOR TO WORCESTER BRUSH & SCRAPER COMPANY, OF WORCESTER, MASSACHUSETTS, A CORPORATION OF MASSACHUSETTS.

BLOCK-SCRAPER.

954,497.

Specification of Letters Patent.  Patented Apr. 12, 1910.

Application filed September 21, 1909. Serial No. 518,786.

*To all whom it may concern:*

Be it known that I, GILBERT C. BEMIS, a citizen of the United States, residing at Lynn, in the county of Essex and State of Massachusetts, have invented an Improvement in Block-Scrapers, of which the following description, in connection with the accompanying drawings, is a specification, like numerals on the drawings representing like parts.

My invention is a block scraper for butchers' use in scraping and cleaning their meat chopping blocks, and has for its principal object the provision of a scraper which is extremely rigid and capable of scraping or cutting the block with a minimum pressure, besides being readily cleaned simply by dipping it in hot water.

The construction and various advantages of my invention will appear more fully from the following description taken in connection with the accompanying drawings, in which I have shown the same.

Figure 1:
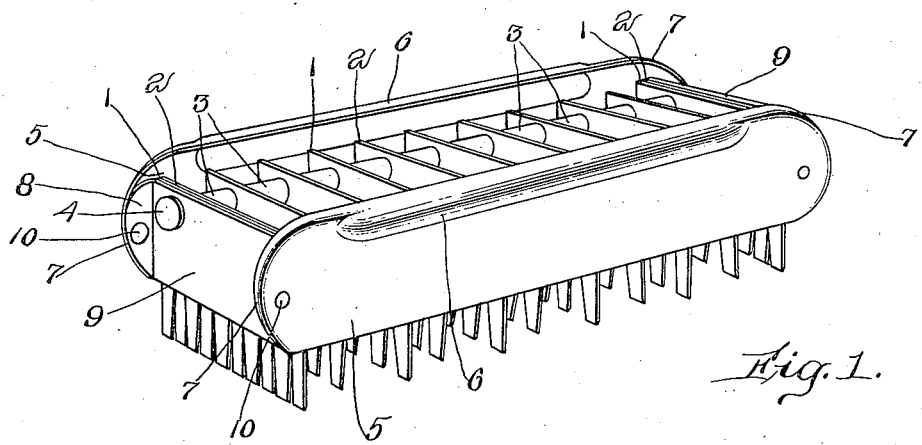
Figure 2:
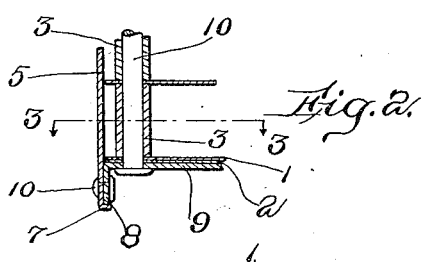
Figure 3:
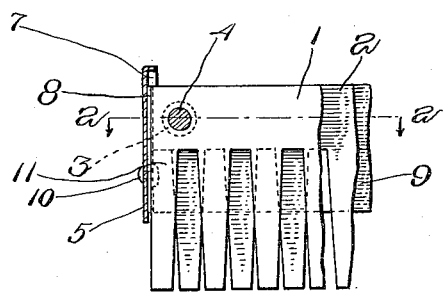
Figure 4:
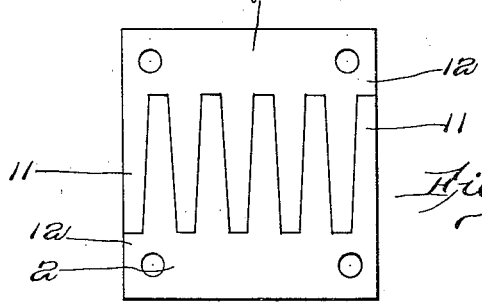
Figure 5:
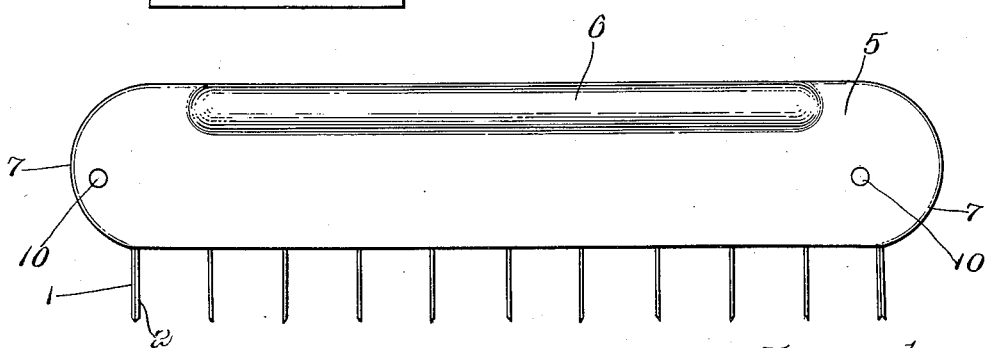

In the drawings, Figure 1 is a perspective view of the block scraper in its preferred embodiment; Fig. 2 is a horizontal sectional view thereof taken approximately on the line 2—2 Fig. 3; Fig. 3 is a sectional view taken on the line 3—3 Fig. 2; Fig. 4 shows the scraper blades and the way they are cut; and Fig. 5 is a view of the scraper in side elevation.

The scraper is entirely of metal, preferably stamped out, and so put together that it is extremely strong and rigid notwithstanding its light and apparently frail structure. The blades 1, 2 are cut as shown in Fig. 4, and instead of being set comparatively close together as heretofore, they are spaced widely apart as shown in Fig. 1, being separated by ferrules 3 mounted on connecting rivets or bolts 4 which hold the successive blades rigidly together. Side supports 5 are provided in closing the ends of the blades, each preferably having a projecting rib 6 at its top edge for facilitating the holding thereof and for affording a smooth surface for the palm of the hand to bear upon. The ends of these side supports are bent inwardly in semicylindrical manner as indicated at 7, and within the cavities or housings thus formed I mount the adjacent snugly fitting end ears 8 of a stiff end piece or bridging strut 9 which is secured to the rest of the scraper by the bolts or rivets 4 adjacent its upper end and by transverse rivets 10 at the lower end of its ears 8. Tightly held by the rivets 4 against said ends 9 are two of the blades 1, 2 flat against each other, whereas throughout the remaining length of the scraper each blade stands alone.

Viewing Fig. 4, it will be seen that the blades are cut from a sheet of steel so as to interlock without loss of metal, each blade terminating at one end in a tooth 11 flush with the end and at its other end being offset as indicated at 12 and said blades are set along the scraper so that the teeth are out of alinement with each other viewing the scraper longitudinally. In other words, the flush end 11 of one blade engages the adjacent side 5, whereas the offset end 12 of the next blade engages said side and so on, only the alternate blades being alike in this respect. At the ends however the two kinds of blades are set flat against each other as shown best in Fig. 3, as the greatest strain comes on the blades at this point, and I have found that, by arranging them in the manner described so that the teeth can spring somewhat and yet will mutually support each other, increased scraping efficiency is secured. As further conducing to this end I sharpen the ends of the teeth on a bevel as clearly shown in Fig. 5, so that half of the blades tend to cut into the block when the scraper is pulled longitudinally in one direction and the other half of the blades tend to cut into the block when the scraper is pulled or pushed longitudinally in the opposite direction. A further object of having two blades with overlapping teeth fixed flat against each other at each end of the scraper is that, besides giving greatest stiffness, it gives a wider cutting edge and therefore a smoother cut or scraping effect, thereby leveling down or smoothing out whatever unevenness the other blades may have produced or tended to produce. I prefer to have these double blades at the ends only instead of having this arrangement throughout the entire length of the scraper as I have found that it is sufficient for securing the smooth cut and stiffness desired. In other words, I provide a heavy tooth construction at the end where the principal strain comes and where it is necessary to have a finishing cut or smoothing effect, and I provide a light construction at the center, while the 11 beveled sharpening, above described, causes the scraper to scrape and cut in both directions. It can be sharpened easily because of the wide spacing of the blades for the easy entrance of the emery wheel or file. By having the teeth or blades wide apart it cuts with less pressure. The longitudinal and transverse rivets and the out-turned end or ears of the end holder plate fitted in the cylindrical ended recess of the sides, cause great strength and rigidity.

Having described my invention, what I claim as new and desire to secure by Letters Patent is, 1. A block scraper, having opposite side hand-holds extending in the direction of the length of the scraper and of its scraping movement, a series of cutting blades extending transversely of the scraper, said blades abutting at their respective ends adjacent the respective side hand-holds perpendicularly thereto, each blade having at its lower portion a plurality of resilient scraper teeth with their ends sharpened on a bevel terminating in a cutting edge lying in the vertical plane of one of the sides of said blade, part of said blades having said cutting edges lying in the plane of the sides toward one end of the scraper and part of said blades having their said cutting edges lying in the plane of the sides of their blades toward the opposite end of the scraper, whereby the former have a maximum cutting efficiency when the scraper is moving in the direction of the first mentioned end of the scraper and the latter have a maximum cutting efficiency when the scraper is moving in the direction of the second mentioned end of the scraper.

2. A block scraper, having opposite side hand holds extending in the direction of the length of the scraper and of its scraping movement, a series of cutting blades extending transversely of the scraper, said blades abutting at their respective ends adjacent the respective side hand holds perpendicularly thereto, each blade having at its lower portion a plurality of resilient scraper teeth, said blades being spaced widely apart with vertical open-passages extending open up from the bottom to the top of the scraper and its blades.

3. A block scraper, having transverse blades terminating in resilient scraping teeth, spacers and rivets extending transversely of said blades adjacent the opposite ends thereof for spacing the blades apart and riveting them in rigid immovable relation to each other, opposite side pieces embracing the ends of said blades and having inwardly bent flanges forming semi-cylindrical recesses, and hand holders having ears fitting snugly within said recesses and immovably secured to said side pieces for bracing the opposite ends of the scraper.

4. In a block scraper, transverse blades terminating at their lower edges in resilient teeth, said blades being spaced apart throughout the length of the scraper, said scraper at its opposite ends having two blades affixed flat against each other with their teeth out of longitudinal alinement whereby each tooth of one blade has a slight yield and is held in supported engagement by two teeth of the other blade, and hand holds extending lengthwise of the scraper and embracing the ends of the blades thereof, said side hand holds projecting beyond the ends of the double end blades, and endholder plates secured against said beveled end blades and having laterally bent ears secured flat against the projecting ends of said hand holds.

In testimony whereof, I have signed my name to this specification, in the presence of two subscribing witnesses.

GILBERT C. BEMIS.

Witnesses:
M. J. SPALDING,
EDWARD MAXWELL.